(12) United States Patent
Rees

(10) Patent No.: US 6,428,727 B1
(45) Date of Patent: Aug. 6, 2002

(54) PROCESS AND APPARATUS FOR PREPARING A MOLDED ARTICLE

(75) Inventor: Herbert Rees, Orangeville (CA)

(73) Assignee: The Elizabeth and Sandor Valyi Foundation, Inc., New York, NY (US)

(*) Notice: Subject to any disclaimer, the term of this patent is extended or adjusted under 35 U.S.C. 154(b) by 0 days.

(21) Appl. No.: 09/506,265

(22) Filed: Feb. 17, 2000

(51) Int. Cl.$^7$ .................. B29C 45/16; B29C 45/46; B29C 45/56

(52) U.S. Cl. ............. 264/163; 264/259; 264/266; 264/328.8; 425/112; 425/122; 425/553; 425/557; 425/567

(58) Field of Search ................... 425/557, 112, 425/567, 122, 553; 264/259, 163, 328.8, 266

(56) References Cited

U.S. PATENT DOCUMENTS

| | | | |
|---|---|---|---|
| 4,717,324 A | * | 1/1988 | Scad et al. ............... 425/130 |
| 4,863,369 A | * | 9/1989 | Scad et al. ............... 425/547 |
| 4,873,045 A | | 10/1989 | Fujita et al. |
| 4,990,301 A | * | 2/1991 | Krishnakumar et al. ..... 264/513 |
| 5,006,188 A | | 4/1991 | Usui et al. |
| 5,044,927 A | * | 9/1991 | DiSimone et al. .......... 425/567 |
| 5,662,856 A | * | 9/1997 | Wunderlich ............... 264/297.2 |
| 6,132,669 A | * | 10/2000 | Valyi et al. .............. 264/266 |
| 6,152,721 A | * | 11/2000 | Schad et al. .............. 425/150 |

\* cited by examiner

*Primary Examiner*—Allan R. Kuhns
(74) *Attorney, Agent, or Firm*—Bachman & LaPointe, P.C.

(57) ABSTRACT

The present disclosure describes a process and an apparatus for delivery of plastic at a viscosity and in the required quantity suitable for compression molding of large, and often odd shaped three-dimensional products, such as large automotive body parts and large appliance parts, etc. These products may consist of plastic only, or may require additional layers of other plastics or even other materials such as woven cloth, inserted into the cavity before molding. The purpose of this invention is to provide a process and apparatus for use with a compression molding machine to supply plastic to a mold cavity, at a number of suitable locations, and in appropriate quantity at each location as required by product shape and thickness. The apparatus and process includes a delivery head which is mounted on rails attached to the machine clamp or the mold cavity, and a connection between the injection unit of the molding machine. With the mold open, the delivery head moves over the mold cavity, and delivers exactly metered globs of plastic directly into the cavity, or on top of an inserted sheet of other plastic, decorative cloth or other film, as specified for the product. The head then retracts and permits the clamp to close and to compress the plastic into the desired shape.

22 Claims, 6 Drawing Sheets

PROCESS AND APPARATUS FOR PREPARING A MOLDED ARTICLE

BACKGROUND OF THE INVENTION

The present invention relates to a method of accurately metering plastic over the cavity of an open compression mold, advantageously for large products made from plastics, such as polyesters, polyolefins, etc., plain or reinforced with glass, etc. It is particularly suitable for depositing such plastics on top of decorative materials, which may be plastic or other materials or combinations of materials. Such a system is shown in copending U.S. patent application Ser. No. 09/130,864, the disclosure of which is incorporated herein by reference.

Large components used often in large quantities, such as in the automotive and appliance industry, can be produced both by injection molding and by compression molding. A problem in injection molding is that the molds are often quite complicated, especially due to the need to distribute the injected hot plastic over large areas, and in relatively heavy and often unequal thicknesses. Also, the injection process makes it difficult to decorate the product during the molding process with a special finish, as for added appearance and sales appeal, and injection requires the added cost of thermoforming for deep draw parts and in general is more difficult than the extrusion/compression process.

In order to overcome these disadvantages, the almost century old compression molding technique, much ignored during the last 50 years, has resurfaced and is now often successfully used for molding large, usually decorated products. The typical compression molding is done in vertical presses. Thermosetting molding material is placed into the heated cavities either in the cold or preheated state and then cured in the closed, hot mold. In a limited way, decoration and reinforcements, with other layers, are possible with this method.

However, thermosetting materials are not as suitable, for better quality, for a wider range of applications, and economically, as thermoplastics could be. The problem now is to supply hot plastic in sufficient quantity, evenly distributed, into the cavity or over an inserted decorative sheet. it is important that little time is wasted between the application of the plastic and the closing of the press. Some methods have used extruded, hot or reheated, very thick film (possibly 5–10 mm), cut into size and shape and then place it over (or into) the cavity. Another attempt is to move the extruder right over the cavity and extrude a heavy sheet right over the cavity while slowly retracting the extruder and extruding die head. The problem here is to coordinate the motion of the extruder so that the proper amount of plastic is dispensed. This is dependent on the speed of motion and the viscosity of the plastic.

Another problem with this method is that a conventional extruder (especially for this application requiring often several kilograms per shot) must be very large, weighing several tons, and is difficult to move accurately; by necessity, such motion is very slow. A serious difficulty is to guide the die head over the cavity, properly aligned, while moving the heavy extruder back and forth. While it is not too difficult to maintain alignment in the vertical plane with the center line of the press, the heavy extruder die is not held from vibrating up and down. On a large product of for example 1.5 meters width, the extruder die head could weigh one ton or more, and this would be at the end of an extruder barrel of 3 meters or more in length. Horizontal alignment would be very difficult to achieve.

Also, the extruder delivers only intermittently, since the time to deliver takes maybe 10 seconds while the cooling process in the mold may take 2 minutes or more. To run a conventional extruder intermittently to this extent is not desirable because it makes it difficult to control and achieve a uniform viscosity of the plastic, and an evenly thick plastic sheet.

The shape (contour) of the product may not be square, and it would be practically impossible to vary the width of the extruded sheet, thus creating a large amount of wasted plastic outside of the actual shape of the cavity.

The sheet thickness could possibly be varied over certain areas if required, using a specially designed and very expensive sectioned die head, in combination with a modulated speed of retracting the die head while delivering the plastic into the mold. Such a method would require one to control and correlate all the critical conditions of speed, temperature, extruder output and extruder die opening, in order to achieve different plastic wall thicknesses in the product. While this would be possible, it would not be very practical.

Another problem is the necessarily slow horizontal motion of the extruder as it dispenses the plastic while retracting; this may take from 5–10 seconds. Added to this is the time it takes to complete the withdrawal of the die head from the molding area so that the clamp can close to start the molding process, which may, due to the heavy mass of the extruder, take another 5–10 seconds, so that from the time the depositing begins it may be 10–20 seconds before the mold can close and start to shape the plastic. During this time, the temperature (and viscosity) of the extruded sheet may be substantially different from one end to the other.

It is, therefore, an object of this invention to limit the moving masses of machinery, and to insure that the plastic is deposited only where required, at an adjustable temperature and viscosity and at an adjustable volume suitable for the desired product. By reducing the moving masses, the time for depositing the plastic will be greatly reduced, and the delivery system out of the way of the closing mold in a much shorter time than before.

Hot, plastic globs will weld together to form a homogeneous mass as the molding pressure is applied under the fast closing mold. Any film used as an insert will bond to the plastic while under pressure.

SUMMARY OF THE INVENTION

The present invention prepares a molded article by the process which comprises: providing a mold cavity and a mold core adjacent said mold cavity, said mold core and mold cavity forming a molding area therebetween; providing a hot plastic delivery means positioned adjacent said molding area and delivering hot plastic from said hot plastic delivery means to at least one shooting pot which maintains said plastic at an elevated temperature for delivery to said molding area; and delivering hot plastic to said molding area from said at least one shooting pot and forming said hot plastic in said mold cavity into a molded article having the shape of said mold cavity at least in part by said mold core which forms the plastic into the shape of the mold cavity.

The apparatus of the present invention comprises: a mold cavity; a hot plastic delivery means positioned adjacent said mold cavity; a mold core adjacent said mold cavity, said mold core and mold cavity forming a molding area therebetween; at least one shooting pot connectable to said hot plastic delivery means for receiving hot plastic from said delivery means, wherein said shooting pot maintains said plastic at an elevated temperature for delivery to said mold cavity; means for delivery of hot plastic from said shooting pot to said molding area; and means for forming said hot plastic in said mold cavity into a molded article having the shape of said mold cavity including said mold core which forms the plastic into the shape of the mold cavity.

BRIEF DESCRIPTION OF THE DRAWINGS

The present invention will be more readily understood from a consideration of the accompanying drawings, in which.

DETAILED DESCRIPTION OF PREFERRED EMBODIMENTS

Figure 1:
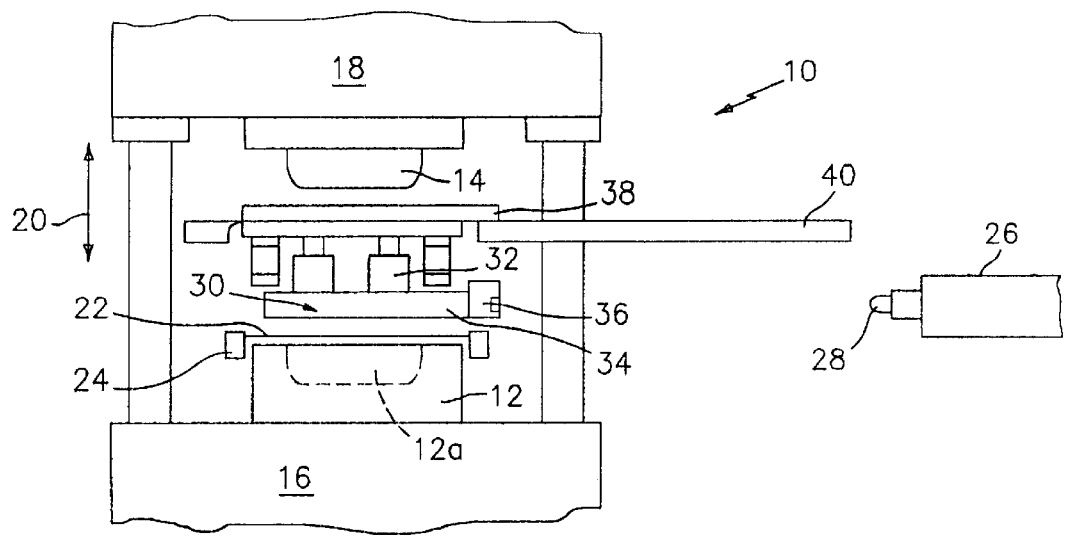
FIGS. 1 and 2 are partly schematic views of the apparatus of the present invention.

According to this invention, a plastics delivery system is associated with and desirably mounted on a vertical clamp of an injection molding machine and is linked to the extruder of the molding machine. The delivery head makes direct contact with the extruder to permit charging of the shooting pots. The delivery head preferably consists of a heated manifold plate which desirably carries an array of heated, individual shooting pots, located for example in a rectangular matrix pattern, or at any locations wherever globs of plastic should be deposited. The plastic is extruded into these shooting pots while the delivery head is outside the molding area, and kept at the appropriate temperature for loading into the mold.

The shooting pots may be individually adjusted for proper volume, and individually heated in case different viscosity is required.

The extruder has the entire time while the mold is closed as during the cooling cycle, available to fill the shooting pots. This makes it possible to use a relatively small extruder, and use either the back pressure alone to fill the pots, or, if necessary use a reciprocating screw which comes standard with injection molding machines. The plasticizing screw can then make as many strokes as required to completely fill the shooting pots in time for the next cycle.

The shooting pots may be filled by a variety of means, including the following.

(a) If the mass of the extruder is relatively small compared with the delivery head, a fixed, heated connection is satisfactory, and the extruder can move together with the delivery head, at every cycle, to position the pots over the mold.

(b) When the extruder is very large, it will be advantageous keep it stationary so as not to move very heavy masses at every cycle, and to connect it to a moving delivery head as with a couple of articulated, heated arms.

(c) In another preferred embodiment, in the out-position, a sprue bushing in the hot runner manifold, which is provided with a built-in check valve or other device to trap the transferred plastic, will butt against a standard machine nozzle and permit the transfer of the plastic from the stationary extruder to the delivery head. There should be a provision to press and lock the manifold and the extruder together, if necessary, so that the nozzle and the sprue bushing will not separate and leak plastic during the transfer of plastic to the delivery head.

The hot manifold plate is desirably carried by a cold main plate which is supported and aligned on each side by rails, and moves in and out of the molding area. The plastic volume within the shooting pots is easily and very accurately adjustable using individual, mechanical stops; all plungers in these pots may be pushed down simultaneously to deposit the content of each pot, with a common pusher plate driven by hydraulic actuators.

Hydraulically actuated switches may control the flow in and out of each shooting pot. In the delivery position, the switches connect each pot with its associated gate from where the plastic is dropped into the molding area. After delivery, the switch returns to the charge position to block the plastic flow to the gate, to prevent drooling and to readmit plastic from the extruder when the head is in the out position. An optional flag or the like can be fastened to the switching lever to block the gate externally, if this should be required for very low viscosity plastics.

As soon as the delivery head is outside the molding area, the extruder can start charging the pots for the next cycle. The plungers are driven back up until each one arrives at its own stop. A pusher plate is driven back by the plungers as the plastic enters the pots, or, the same hydraulic actuators can be used to return the pusher plate back, if this should be required.

The extruder needs to be sized only to have enough plasticizing capacity to make it possible to make a certain number of shots per minute, times the weight of the plastic per unit produced, divided by a time factor (in percent) which is approximately the cooling time, divided by the cycle time, times 100. In the following example, the time factor is assumed to be 75%.

Example: a 1.5 kg shot at a cycle of 25 per hour, needs only 1.5×25÷0.75=50.0 kg per hour, which is a comparably small extruder for such a large product.

Figure 2:
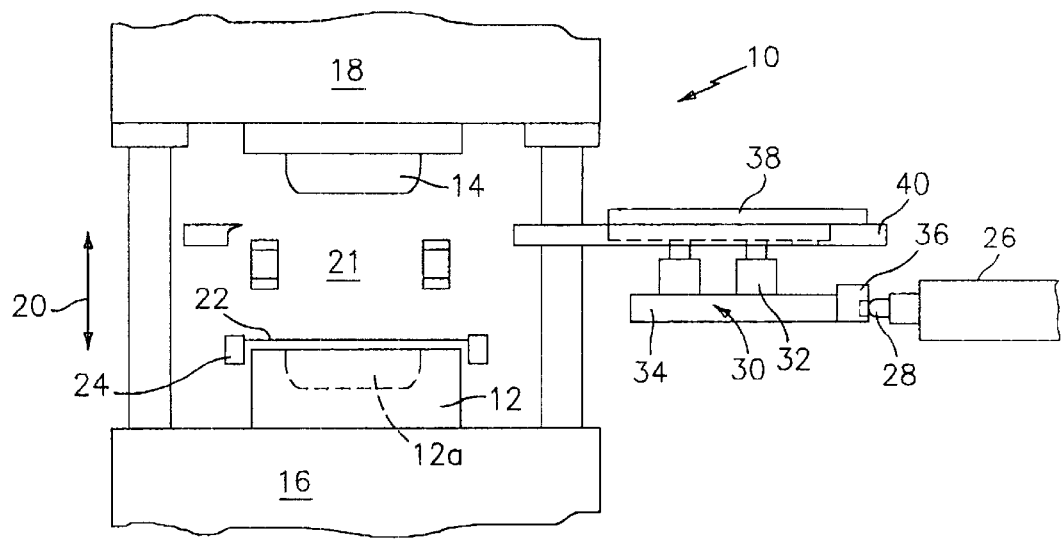

Referring to the drawings, FIGS. 1 and 2 show a vertical clamp of an injection molding machine 10 including a mold cavity half 12 having a mold cavity 12a therein and cooperating mold core half 14 mounted on respective platens 16, 18. Mold cavity 12a has a shape of the desired final molded article. At least one of the cavity half and core half is reciprocable in the direction of arrow 20 from an open position as shown in FIGS. 1–2 to a closed position and from a closed position to an open position via suitable motive means (not shown). The mold cavity half and mold core half form a molding area 21 therebetween.

If desired, a sheet or film 22, which could be a clear plastic film, a colored plastic film, a web or decorating cloth, for example, is held in frame 24 above mold cavity 12a.

Hot plastic delivery means 26, as an extruder/injection unit, having a nozzle 28, is arranged adjacent molding machine 10 and molding area 21 to couple with delivery head 30 which carries at least one shooting pot 32. Hot plastic is delivered from the hot plastic delivery means 26 through nozzle 28 to the shooting pots 32 in the position shown in FIG. 2. The delivery head 30 is then moved into the molding area 21 above sheet 22 between mold cavity 12 and mold core 14 as shown in FIG. 1. In this delivery position the plastic to be molded is deposited from the shooting pots 32 in a number of precisely metered hot globs to any desired location, as on sheet 22 if used or directly into mold cavity 12a, at the precisely controlled temperature and viscosity. As soon as the plastic is delivered from the shooting pots, the delivery head 30 is withdrawn into the out position as shown in FIG. 2 so that the mold core 14 can close into the mold cavity and form the desired molded product while the shooting pots are being recharged from the hot plastic delivery means or extruder.

The delivery head desirably includes a hot runner manifold 34 and a sprue bushing 36 at the end of the manifold for connection to nozzle 28. A check valve (not shown) is preferably included in the sprue bushing to prevent any back flow of plastic from the manifold after delivery of hot plastic thereto. The delivery head 30 may be supported by a cold main plate 38 which slides on tracks 40 by rollers or the like between the in and out positions. In the in position, the delivery head position may be accurately controlled by stops, and in the out position the delivery head position is determined by pressing the sprue against machine nozzle.

In the embodiment where the extruder is quite small compared with the masses of the delivery head, the extruder can be mounted directly on the delivery head so that the extruder may move with the delivery head.

Figure 3:
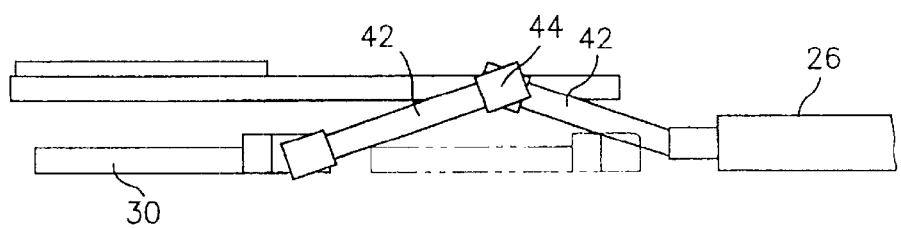
FIG. 3 is a partial view showing an alternate embodiment.

In a further embodiment, shown in FIG. 3, which could be advantageous with very large masses, the hot plastic delivery means or extruder 26 could be stationary and connected to the delivery head 30 by articulated, heated arms 42 and joints 44, with the delivery head also travelling on tracks or rails as in FIGS. 1–2. Naturally, the delivery head 30 would carry the shooting pots as in FIGS. 1–2.

Figure 4:
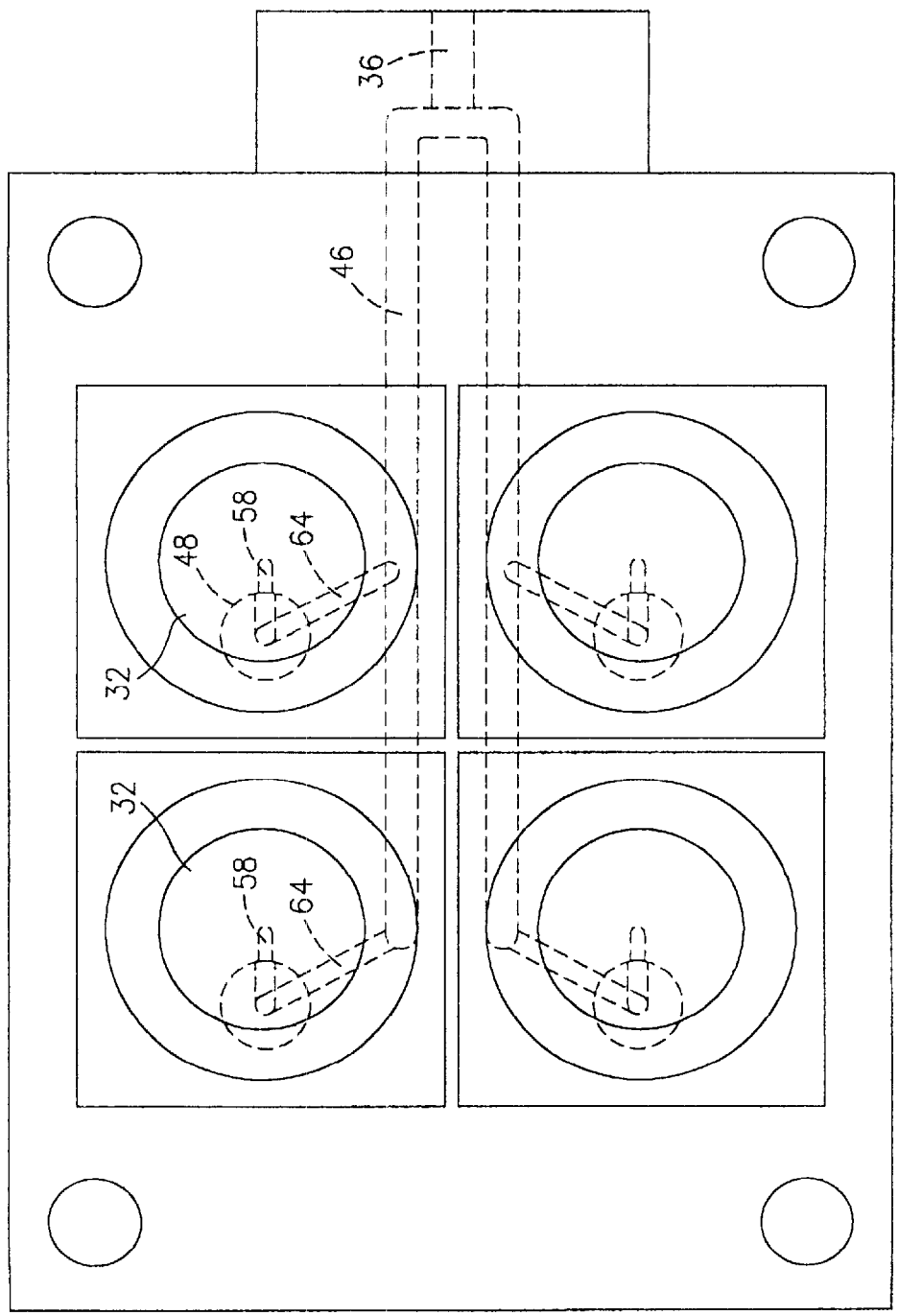
FIG. 4 is a top view showing an array of shooting pots.
Figure 5:
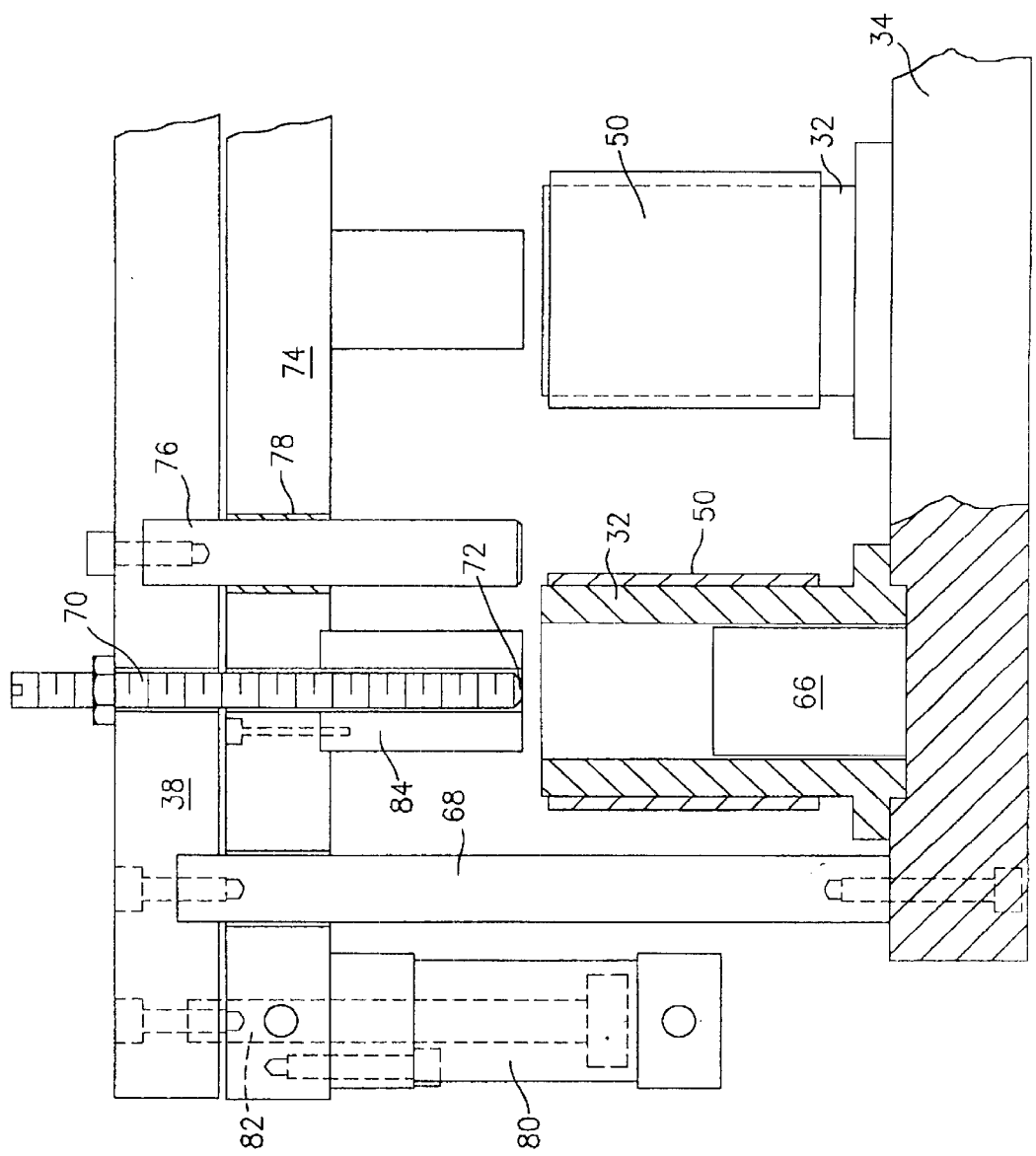
FIGS. 5, 6A and 6B are detail views of the shooting pot assembly and plastic delivery.
Figure 6A:
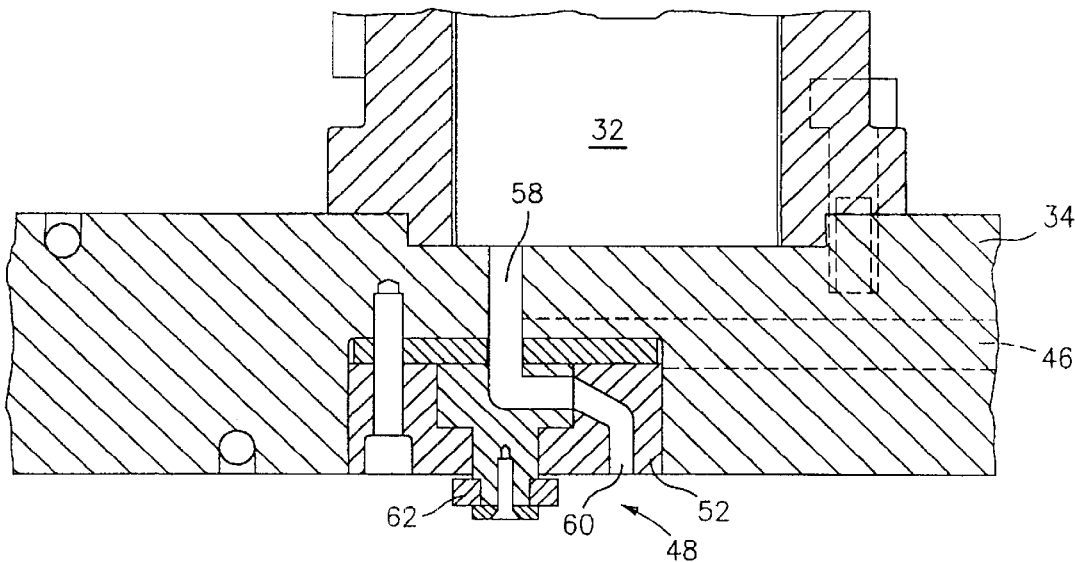
Figure 6B:
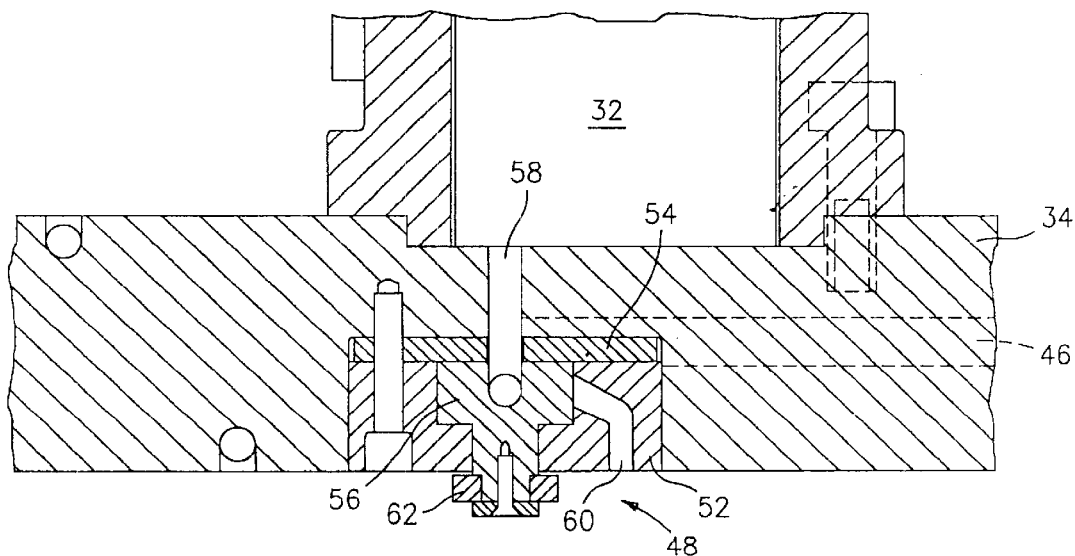

The hot runner manifold 34 would naturally be heated as by heaters 50 shown in FIG. 5 to control the temperature of the plastic within the shooting pots and includes a desired number of shooting pots 32 mounted thereon. Any number of shooting pots may be used depending on the particular application. For example, four (4) such shooting pots 32 are shown in FIG. 4. Manifold channels 46 connect the plastic coming from the injection unit through sprue bushing 36 to a two-position switch assembly 48 shown in detail in FIGS. 6A and 6B. This assembly includes a housing 52, a base plate 54 and a rotor 56. In the position shown in FIG. 6B, plastic from the extruder is directed from manifold 34 to shooting pot 32 via passage 58 in switch assembly 48 with rotor 56 turned by suitable motive means (not shown) to block outlet passage 60 as shown in FIG. 6B. In the second position shown in FIG. 6A, plastic is delivered from the shooting pots 32 via passage 58 and outlet passage 60 to the mold cavity or on top of sheet 22. The switching levers 62 at the end of the rotor 56 are connected to suitable links and actuators (not shown) to permit the switching from the position shown in FIG. 6B to that shown in FIG. 6A and vice versa as required.

Plastic enters the shooting pots 32 via manifold channels 46 (see FIG. 4) and branch channels 64 and through passage 58 into the shooting pot via rotor 56. After the shooting pots are filled and the delivery head positioned in the molding area 21, the rotor 56 is turned and the plastic can flow from the delivery head via a mold gate if used (not shown). The system does not require a balancing of the flow paths from the extruder to various mold gates as is common with hot runner manifolds.

Referring to FIG. 5, hot runner manifold 34 carries the desired number of shooting pots 32. Inside the shooting pots are pistons 66, shown in FIG. 5 in the fully discharged position. A number of support pillars 68 connect the manifold with main plate 38. An adjustable stop or rod 70 is connected to the main plate 38 and extends adjacent to the center of each shooting pot. The tip 72 of these stops limits the upward stroke of the pistons during the charging cycle. The location of the stops can be adjusted so that the volume of the shooting pots is precisely set. The main plate 38, which is not heated, carries rollers or gliders (not shown) which travel on the rails or tracks 40 to permit easy movement of the delivery system as described above.

Below the main plate 38 is movable pusher plate 74, also unheated, which is guided with pins 76 and bushings 78 for proper alignment with the main plate. At least two (2) hydraulic cylinders 80 are mounted on the pusher plate 74, and the piston rods 82 are held in the main plate. Loosely surrounding each adjustable rod 70 are pushers 84 which are fastened to the pusher plate 74.

As the shooting pots 32 are gradually filled with hot plastic, in the charging position outside of the molding area 21, the pistons 66 rise in the heated shooting pots until they come to their respective stops. As the pistons rise they can push the movable pusher plate 74 upwards; however, to insure that the pusher plate moves all the way up without cocking because for example of different stroke lengths, it would be advantageous to energize cylinders 80 and rods 82 in reverse to bring the pusher plate all the way to the desired upwards position.

As soon as the pots are full or contain the desired amount of plastic and after the shot from the previous cycle has been removed and if applicable, a new sheet placed over the now empty mold cavity, the system is ready to move the delivery head 30 into the molding area 21 to deliver plastic to the mold for the next cycle.

Figure 7:
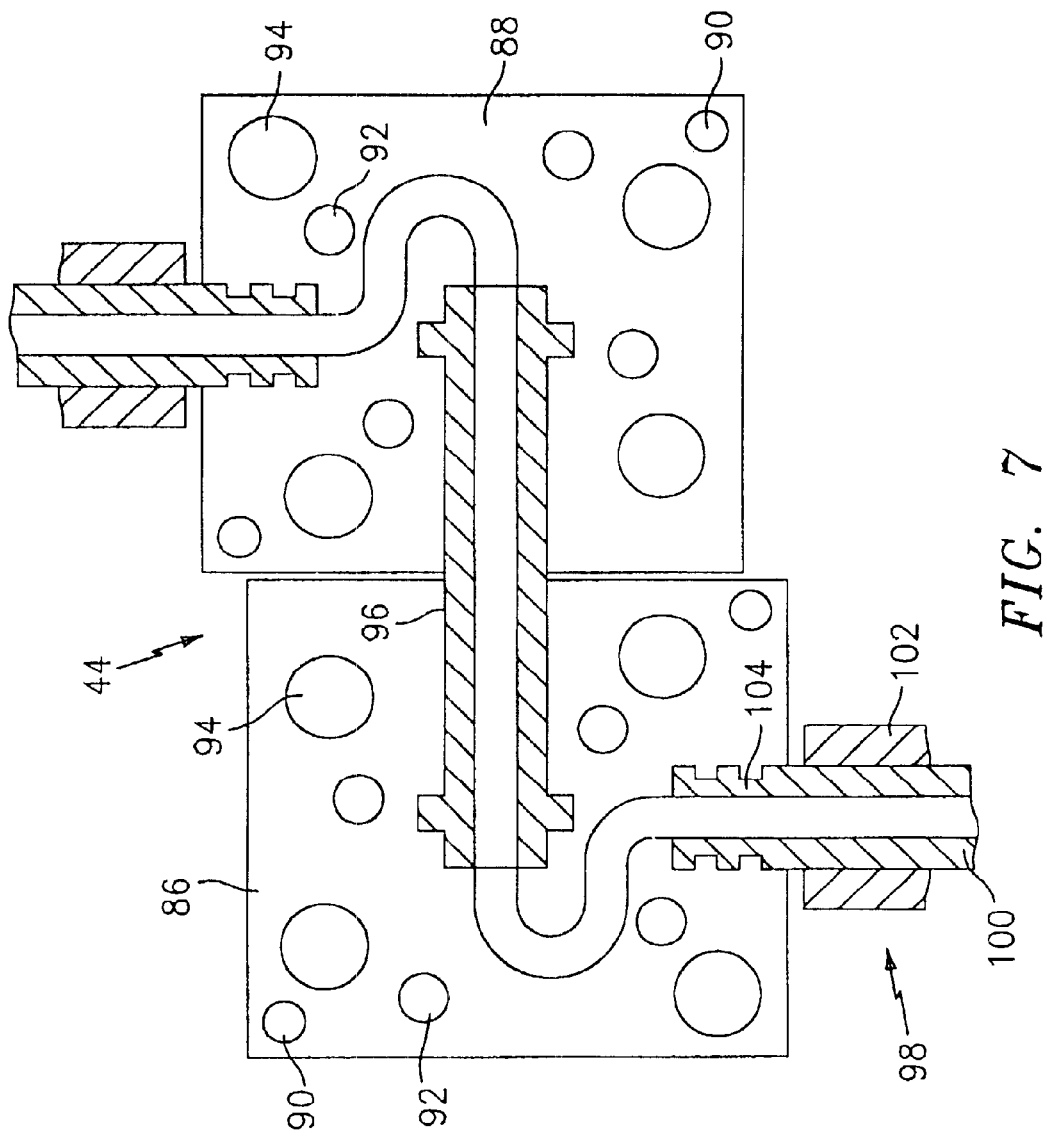
FIGS. 7 and 8 are detail views of alternate embodiments.

FIG. 7 shows schematically the moving joints 44 shown in FIG. 3. Each joint section includes two machined matching blocks 86, 88 with each block having a block half and the block halves connected together. The two block halves are located with dowels 90 and held together with a sufficient number of screws 92 to contain the plastic pressure. Heaters 94 maintain temperature so that the plastic will be kept at its desired temperature, and also to permit easy, fast start-up from cold after a shutdown of the system. A swivel 96 connects the two joints as shown. The arms 98 include outwardly extending pipes 100 surrounded by heaters 102. When assembled, the swivel is free to turn in its swivel 96; however, the pipes are solidly clamped in their corresponding sockets 104. Naturally, thermocouples (not shown) may be strategically located in the swivel joints and in the pipes. The joints connecting these units to the manifold may be similar in construction, except that one of the two joints carries a connecting flange to the manifold and not a pipe.

Figure 8:
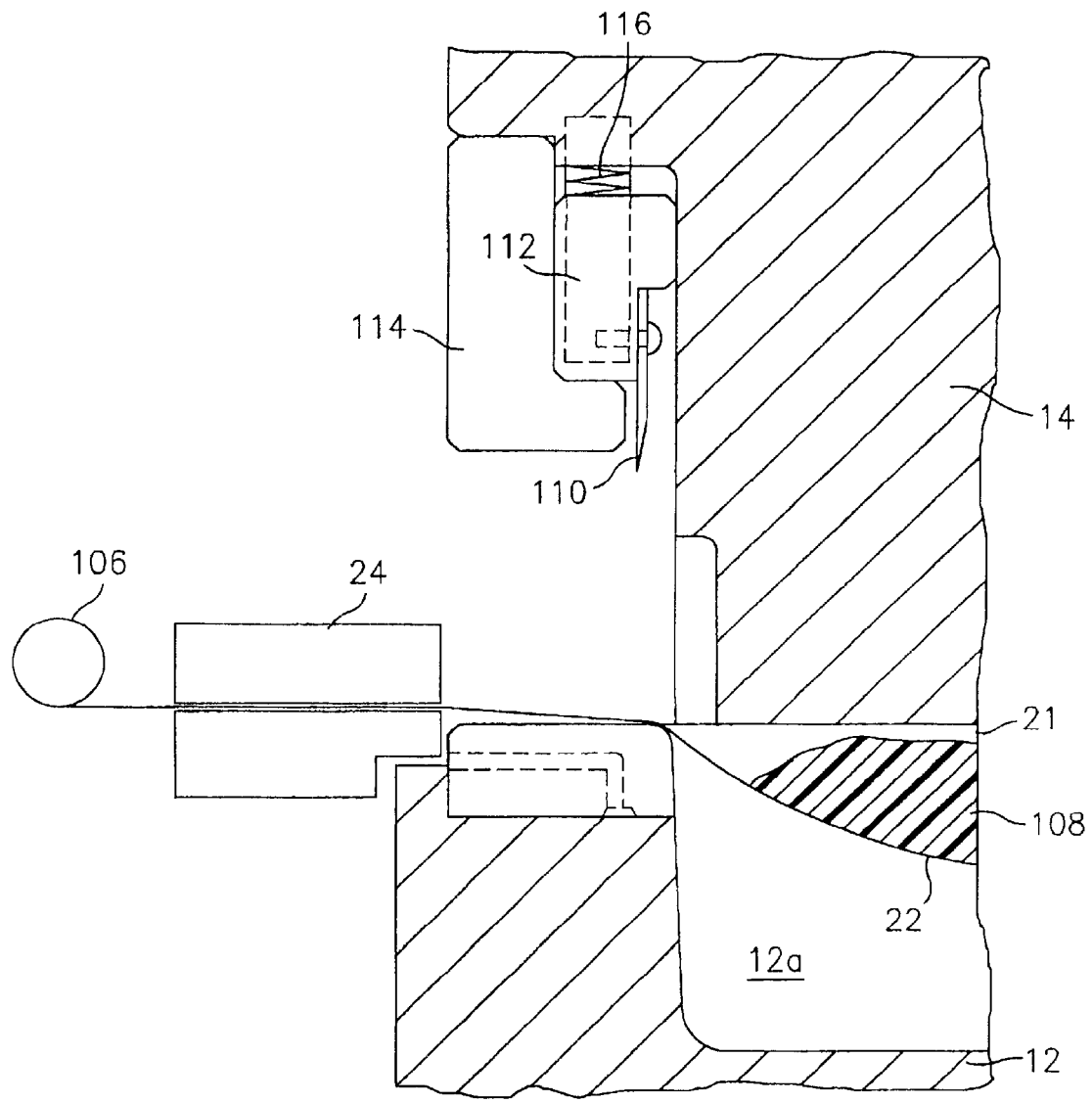

FIG. 8 shows sheet or film 22 delivered to molding area 21 from a roll 106, with plastic material 108 thereon and with mold core half 14 and mold cavity half 12. The film remaining in frame 24 must be cut around the mold cavity 12a before opening the mold so that the molded-in film does not remain attached to the remainder of the film including the scrap film within the frame.

This is achieved by a ring of knives 110 surrounding the mold cavity adjacent the edge thereof. The knives or cutters are mounted on a spring-loaded holder 112 and guided and positioned by a frame 114 surrounding the holder. The frame also acts as a stop surrounding the mold cavity to limit the downward stroke of the mold clamp. As the core descends into the mold cavity, the cutters bear down on the film with the cutting force generated by springs 116. Near the end of the mold clamp stroke when the core is almost completely within the mold cavity, the knives separate the molded in film from the remaining film. Desirably, a soft strip can be placed beneath the film at the cutting location to improve the life of the knives.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. Process for preparing a molded article, which comprises:
   providing a mold cavity and a mold core adjacent said mold cavity, said mold core and mold cavity forming a molding areas therebetween;
   providing a hot plastic delivery means positioned adjacent said molding area and delivering hot plastic from said hot plastic delivery means to at least one shooting pot which maintains said plastic at an elevated temperature for delivery to said molding area;
   delivering hot plastic to said molding area from said at least one shooting pot and forming said hot plastic in said mold cavity into a molded article having the shape of said mold cavity at least in part by said mold core which forms the plastic into the shape of the mold cavity; and
   wherein said injection unit delivers hot plastic to a hot runner manifold plate which carries said at least one shooting pot, and wherein said manifold plate in turn delivers hot plastic to said at least one shooting pot, including the step of controlling the volume of plastic delivered to said at least one shooting pot by adjustable stops in said at least one shooting pot so that the volume of plastic delivered to said at least one shooting pot is precisely set, and wherein said hot runner manifold plate is connected to a main plate above the hot runner manifold plate.

2. Process according to claim 1, wherein said delivery means delivers hot plastic to at least one shooting pot positioned adjacent said molding area.

3. Process according to claim 1, including placing a sheet over said mold cavity, depositing hot plastic on said sheet from said at least one shooting pot to form a combination of a sheet with hot plastic thereon, and subsequently forming said sheet-hot plastic combination into a molded article having the shape of said mold cavity, wherein said sheet is an outer layer of the molded article.

4. Process according to claim 1, including delivering hot plastic from an injection unit located outside said molding area to said at least one shooting pot located outside said molding area, moving said at least one shooting pot to said molding area for delivery of hot plastic thereto, and moving said at least one shooting pot outside of said molding area to permit said mold core and mold cavity to form said molded article.

5. Process according to claim 1, including delivering hot plastic to a plurality of said shooting pots.

6. Process according to claim 5, wherein said injection unit delivers hot plastic to a hot runner manifold plate which carries an array of said shooting pots, and wherein said manifold plate in turn delivers hot plastic to said shooting pots, including the step of providing said adjustable stops in each of said shooting pots.

7. Process according to claim 6, including delivering hot plastic from the hot runner manifold to a two-position switch assembly which delivers plastic from the manifold to a shooting pot in a first position and from a shooting pot to the molding area in a second position.

8. Process according to claim 3, including moving said sheet from a roll of sheet and cutting said sheet from the roll with cutting means associated with said mold core.

9. Process according to claim 1, wherein the adjustable stops are mounted on the main plate and extend into said at least one shooting pot.

10. Process according to claim 1, including mounting a pusher plate between the main plate and the hot runner manifold plate.

11. Apparatus for preparing a molded article, which comprises:
    a mold cavity;
    a hot plastic delivery means adjacent said mold cavity;
    a mold core adjacent said mold cavity, said mold core and mold cavity forming a molding area therebetween;
    at least one shooting pot connectable to said hot plastic delivery means for receiving hot plastic from said delivery means, wherein said shooting pot maintains said plastic at an elevated temperature for delivery to said molding area;
    means for delivery of hot plastic from said shooting pot to said molding area;
    means for forming said hot plastic in said mold cavity into a molded article having the shape of said mold cavity including the mold core which forms the plastic into the shape of the mold cavity; and
    including a hot runner manifold plate which carries said at least one shooting pot, wherein said hot plastic delivery means delivers hot plastic to said manifold plate which in turn delivers hot plastic to said at least one shooting pot, including adjustable stops in said at least one shooting pot so that the volume of plastic delivered to said at least one shooting pot is precisely set, and including a main plate above the hot runner manifold plate, wherein the hot runner manifold plate is connected to said main plate.

12. Apparatus according to claim 11, wherein said delivery means is operative to deliver hot plastic to said shooting pot positioned adjacent said molding area.

13. Apparatus according to claim 11, including means for holding a sheet over said mold cavity, wherein said means for delivering hot plastic from said shooting pot deposits hot plastic onto said sheet, and means for subsequently forming said sheet-hot plastic combination into a molded article having the shape of said mold cavity, wherein said film is an outer layer of the molded article.

14. Apparatus according to claim 13, including a roll of said sheet for supplying said sheet, and cutting means associated with said mold core for cutting said sheet from the roll.

15. Apparatus according to claim 11, including means for moving said at least one shooting pot between a position outside said molding area and a position within said molding area, wherein said hot plastic delivery means is an injection unit located outside said molding area which delivers hot plastic to said shooting pot outside said molding area, and wherein said means for moving moves said shooting pot to a position within said molding area for delivering hot plastic thereto and to a position outside of said molding area to permit said mold core and mold cavity to form said molded article.

16. Apparatus according to claim 11, including a plurality of said shooting pots.

17. Apparatus according to claim 16, including a hot runner manifold plate which carries an array of said shooting pots, wherein said hot plastic delivery means delivers hot plastic to said manifold plate which in turn delivers hot plastic to said shooting pots, including said adjustable stops in each of said shooting pots.

18. Apparatus according to claim 17, including a two-position switch assembly of said manifold having a first position for delivery of plastic from the manifold to a shooting pot and a second position for delivery of plastic from a shooting pot to the molding area.

19. Apparatus according to claim 11, wherein said adjustable stops are mounted to the main plate and extend into said at least one shooting pot.

20. Apparatus according to claim 11, including a pusher plate mounted between the main plate and the hot runner manifold plate.

21. Process for preparing a molded article, which comprises:

provuding a mold cavity and a mold core adjacent said mold cavity, said mold core and mold cavity forming a molding areas therebetween;

providing a hot plastic delivery means positioned adjacent said molding area and delivering hot plastic from said hot plastic delivery means to at least one shooting pot which maintains said plastic at an elevated temperature for delivery to said molding area;

delivering hot plastic to said molding area from said at least one shooting pot and forming said hot plastic in said mold cavity into a molded article having the shape of said mold cavity at least in part by said mold core which forms the plastic into the shape of the mold cavity; and including delivering hot plastic from an injection unit located outside said molding area to said at least one shooting pot located outside said molding area, moving said at least one shooting pot to said molding area for delivery of hot plastic thereto, and moving said at least one shooting pot outside of said molding area to permit said mold core and mold cavity to form said molded article, including moving said at least one shooting pot on articulated heated arms.

22. Apparatus for preparing a molded article, which comprises:

a mold cavity;

a hot plastic delivery means adjacent said mold cavity;

a mold core adjacent said mold cavity, said mold core and mold cavity forming a molding area therebetween;

at least one shooting pot connectable to said hot plastic delivery means for receiving hot plastic from said delivery means, wherein said shooting pot maintains said plastic at an elevated temperature for delivery to said molding area;

means for delivery of hot plastic from said shooting pot to said molding area;

means for forming said hot plastic in said mold cavity into a molded article having the shape of said mold cavity including the mold core which forms the plastic into the shape of the mold cavity; and including means for moving said at least one shooting pot between a position outside said molding area and a position within said molding area, wherein said hot plastic delivery means is an injection unit located outside said molding area which delivers hot plastic to said shooting pot outside said molding a rear and wherein said means for moving moves said shooting pot to a position within said molding area for delivering hot plastic thereto and to a position outside of said molding area to permit said mold core and mold cavity to form said molded article, including articulated heated arms for moving said at least one shooting pot.

* * * * *